(12) United States Patent
Mouri et al.

(10) Patent No.: US 10,214,134 B2
(45) Date of Patent: Feb. 26, 2019

(54) ILLUMINATION DEVICE FOR VEHICLE

(71) Applicants: Fumihiko Mouri, Owariasahi (JP);
Susumu Yamamoto, Toyota (JP);
Takeshi Masuda, Shizuoka (JP);
Misako Nakazawa, Shizuoka (JP)

(72) Inventors: Fumihiko Mouri, Owariasahi (JP);
Susumu Yamamoto, Toyota (JP);
Takeshi Masuda, Shizuoka (JP);
Misako Nakazawa, Shizuoka (JP)

(73) Assignees: TOYOTA JIDOSHA KABUSHIKI KAISHA, Toyota-shi (JP); KOITO MANUFACTURING CO., LTD., Minato-ku (JP)

( * ) Notice: Subject to any disclaimer, the term of this patent is extended or adjusted under 35 U.S.C. 154(b) by 0 days.

(21) Appl. No.: 15/714,180

(22) Filed: Sep. 25, 2017

(65) Prior Publication Data

US 2018/0099604 A1 Apr. 12, 2018

(30) Foreign Application Priority Data

Oct. 7, 2016 (JP) ................................. 2016-199077

(51) Int. Cl.
*B60Q 1/14* (2006.01)
*B60Q 1/00* (2006.01)
(Continued)

(52) U.S. Cl.
CPC .......... *B60Q 1/0023* (2013.01); *B60Q 1/085* (2013.01); *B60Q 1/50* (2013.01); *B60Q 9/008* (2013.01);
(Continued)

(58) Field of Classification Search
CPC .... B60Q 1/0023; B60Q 1/143; B60Q 1/1423; B60Q 9/004; B60Q 2300/45
(Continued)

(56) References Cited

U.S. PATENT DOCUMENTS 8,635,010 B2 * 1/2014 Li ........................ G01C 21/26
362/37
9,341,338 B2 * 5/2016 Ishizaki ................. B60Q 1/143
(Continued)

FOREIGN PATENT DOCUMENTS

JP 2013-124092 A 6/2013
JP 2013-203251 10/2013
(Continued)

OTHER PUBLICATIONS

Extended European Search Report dated Feb. 16, 2018 in European Patent Application No. 17194605.6.

*Primary Examiner* — Tung X Le
(74) *Attorney, Agent, or Firm* — Oblon, McClelland, Maier & Neustadt, L.L.P.

(57) ABSTRACT

An illumination device for a vehicle, includes: a detection unit that detects a person; an illumination unit that illuminates light in a direction toward a road surface, an illumination region of the light being alterable; and a control unit that, in a case in which a person is detected by the detection unit and there is a possibility of collision between the detected person and the vehicle, controls the illumination unit so as to illuminate light at a region in a range of view of the detected person that is separated from the person by a pre-specified distance, and so as to move the light in a direction of movement of the detected person while maintaining the separation at the pre-specified distance.

8 Claims, 9 Drawing Sheets

(51) Int. Cl.
  *B60Q 1/08* (2006.01)
  *B60Q 1/50* (2006.01)
  *B60Q 9/00* (2006.01)
  *G01S 17/93* (2006.01)
  *G06K 9/00* (2006.01)
  *F21S 41/141* (2018.01)
(52) U.S. Cl.
  CPC ........ *G01S 17/936* (2013.01); *G06K 9/00805* (2013.01); *B60Q 2300/45* (2013.01); *B60Q 2400/50* (2013.01); *F21S 41/141* (2018.01)
(58) Field of Classification Search
  USPC ..................................................... 315/77, 82
  See application file for complete search history.

(56) References Cited

U.S. PATENT DOCUMENTS

| | | | |
|---|---|---|---|
| 2008/0175012 A1 | 7/2008 | Shimaoka et al. | |
| 2012/0019655 A1* | 1/2012 | Fukamachi | G06T 7/2006 348/142 |
| 2013/0154815 A1 | 6/2013 | Min et al. | |
| 2014/0062685 A1* | 3/2014 | Tamatsu | B60Q 5/005 340/425.5 |
| 2016/0090024 A1* | 3/2016 | Nagasawa | B60Q 1/143 315/82 |
| 2016/0096467 A1 | 4/2016 | Murakami et al. | |

FOREIGN PATENT DOCUMENTS

| | | |
|---|---|---|
| JP | 2014-046838 A | 3/2014 |
| JP | 2016-074235 | 5/2016 |

* cited by examiner

ILLUMINATION DEVICE FOR VEHICLE

CROSS-REFERENCE TO RELATED APPLICATION

This application is based on and claims priority under 35 USC 119 from Japanese Patent Application No. 2016-199077 filed on Oct. 7, 2016, which is incorporated by reference herein.

BACKGROUND

Technical Field

The present disclosure relates to an illumination device for a vehicle that is installed in a vehicle and illuminates light.

Related Art

Japanese Patent Application Laid-Open (JP-A) No. 2013-203251 proposes a light illumination control device that acquires information relating to the position of an obstacle such as a pedestrian in the vicinity of a vehicle and illuminates a light that is provided at the vehicle, with a different color from a headlamp of the vehicle, in a direction toward the location of the obstacle. According to JP-A No. 2013-203251, both a driver at the vehicle side and a person at the obstacle side may be informed that a hazard is imminent by seeing the light with the different color from the headlamp. Thus, situations in which positional relationships between obstacles and the vehicle become dangerous may be suppressed.

In JP-A No. 2013-203251, when the light with the different color from the headlamp is illuminated onto an obstacle, notice is given that a hazard is imminent. However, when the light is illuminated onto a person, if the illuminated person does not see the light source or their own position, the person is unlikely to notice the illuminated light. Therefore, there is scope for improvement.

SUMMARY

The present disclosure is made in consideration of the circumstances described above and an object of the present disclosure is to provide an illumination device for a vehicle that may illuminate light that a person is more likely to notice than light illuminated toward the person.

An aspect of the present disclosure includes: a detection unit that detects a person; an illumination unit that illuminates light in a direction toward a road surface, an illumination region of the light being alterable; and a control unit that, when a person is detected by the detection unit and there is a possibility of collision between the detected person and the vehicle, controls the illumination unit so as to illuminate light at a region in a range of view of the detected person that is separated from the person by a pre-specified distance, and so as to move the light in a direction of movement of the detected person while maintaining the separation at the pre-specified distance.

DESCRIPTION OF EMBODIMENTS

Figure 1:
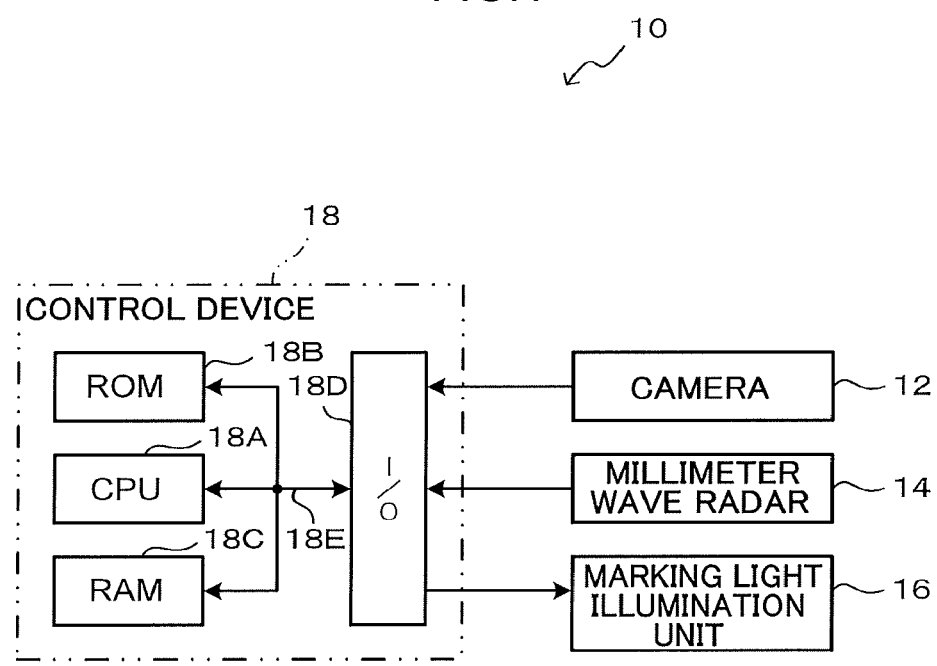
FIG. 1 is a block diagram showing schematic structures of an illumination device for a vehicle according to a present exemplary embodiment.

Herebelow, an example of an exemplary embodiment of the present invention is described in detail with reference to the attached drawings. FIG. 1 is a block diagram showing schematic structures of an illumination device for a vehicle according to the present exemplary embodiment.

In an illumination device for a vehicle 10 according to the present exemplary embodiment, as shown in FIG. 1, a marking light illumination unit 16 that serves as an example of an illumination unit is connected to a control device 18. The marking light illumination unit 16 is controlled by the control device 18.

The marking light illumination unit 16 illuminates light in a direction toward the road surface in order to draw the attention of a person. In the present exemplary embodiment, the marking light illumination unit 16 illuminates the light within a range of view of a person who is located in a progress direction of the vehicle, drawing the person's attention to the approach of the vehicle. A color and brightness of the light illuminated from the marking light illumination unit 16 may be the same color and brightness as light from a headlamp, or light of a different color and/or brightness from the headlamp may be illuminated. If the color and brightness are the same as the color and brightness of the headlamp, then when the headlamp is in a low-beam state, the attention of a person located in a high-beam region may be drawn, and when the headlamp is in a high-beam state, the attention of a person located beyond the high beam may be drawn.

In the present exemplary embodiment, an example is described in which the marking light illumination unit 16 is provided separately from a light source of the headlamp. However, the marking light illumination unit 16 may use the same light source as the headlamp.

The control device 18 is constituted by a microcomputer including a CPU 18A, a ROM 18B, a RAM 18C and an I/O unit 18D. The control device 18 controls lighting, extinguishing and illumination directions of the marking light illumination unit 16.

Tables for control of the marking light illumination unit 16, a program for executing illumination control, and so forth are memorized in the ROM 18B of the control device 18. The RAM 18C is used as a working memory that memorizes intermediate data, produced by calculations and the like carried out by the CPU 18A, and so forth.

A camera 12 that images in front of the vehicle and a millimeter wave radar 14 are connected to the I/O unit 18D. Imaging results from the camera 12 and detection results from the millimeter wave radar 14 are inputted to the control device 18. The camera 12 and the control device 18 correspond to an example of a detection unit, and the millimeter wave radar 14 and the control device 18 correspond to an example of a control unit. The CPU 18A, which is a hardware processor, loads and executes the program for executing illumination control. The CPU 18A functions as the detection unit and the control unit.

By image processing of imaging results from the camera 12, such as pattern matching of images and the like, the control device 18 detects a person, who may be a pedestrian, a cyclist or the like.

From detection results of millimeter waves that are transmitted from the millimeter wave radar 14 and reflected by an obstacle, which may be a person, the control device 18 detects a relative distance and a relative speed between the vehicle and the obstacle.

Figure 2:
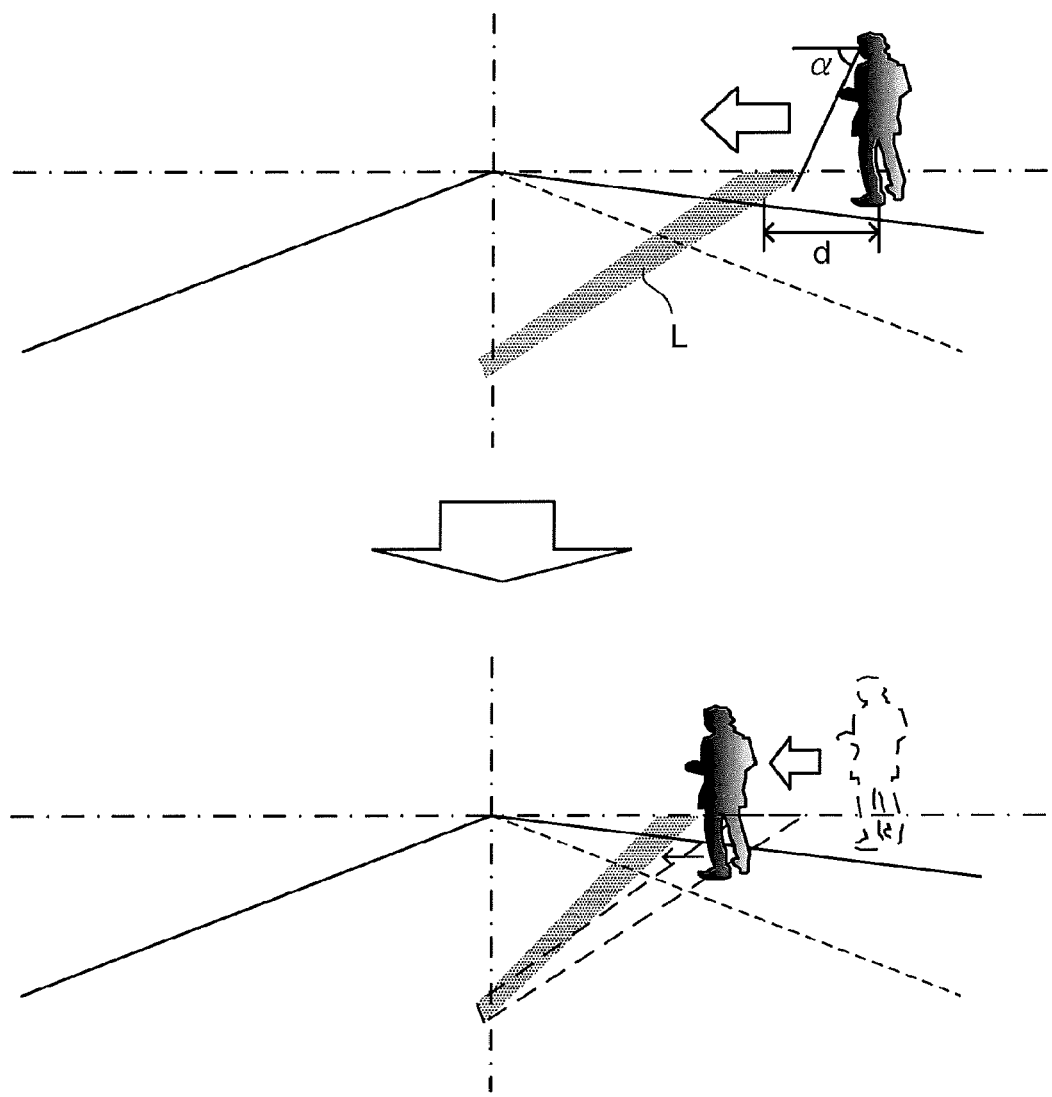
FIG. 2 is a diagram for describing illumination of light from a marking light illumination unit of the illumination device for a vehicle according to the present exemplary embodiment.

When the control device 18 detects a person, as shown in FIG. 2, the control device 18 controls the marking light illumination unit 16 so as to illuminate light L at a region that is separated by a pre-specified distance d from the person within a range of view of the person. If the person is moving, then as shown in the lower part of FIG. 2, the control device 18 controls the marking light illumination unit 16 so as to move the light while keeping the separation between the person and the light illuminated from the marking light illumination unit 16 at the pre-specified distance. The pre-specified distance d is a distance such that the person is likely to see the light projected onto the road surface. For example, the distance d is a distance roughly equivalent to the height of the person (a variable distance), or a distance of 1.5 to 2 m or the like (a fixed distance) or the like. A person's angle of view α to downward is around 70°. Therefore, it is preferable to employ a pre-specified distance d that is at least a distance corresponding to an angle of view of 70°. If the light is too far from the person, the person is less likely to see the light illuminated onto the road surface. Therefore, a distance at which the person is likely to see the light, in a range of a few meters from the distance corresponding to the angle of view of 70°, is preferable.

When, for example, a pedestrian is moving so as to cross in front of the vehicle as illustrated in FIG. 2, the pedestrian's attention is drawn to the approach of the vehicle by a marking light being illuminated at a region in front of the pedestrian in their range of view (a region that is separated by the pre-specified distance from the pedestrian toward the road center in the vehicle width direction). If a pedestrian is walking along a road or the like, a marking light is illuminated at a region in front of the pedestrian in their range of view to draw their attention, in order to discourage sudden crossing of the road or the like.

In the descriptions below, the light illuminated at a region that is separated from a person by a pre-specified distance is referred to simply as "the marking light".

Now, examples of five types of the marking light illumination unit 16 are described with reference to FIG. 3 to FIG. 7.

Figure 3:
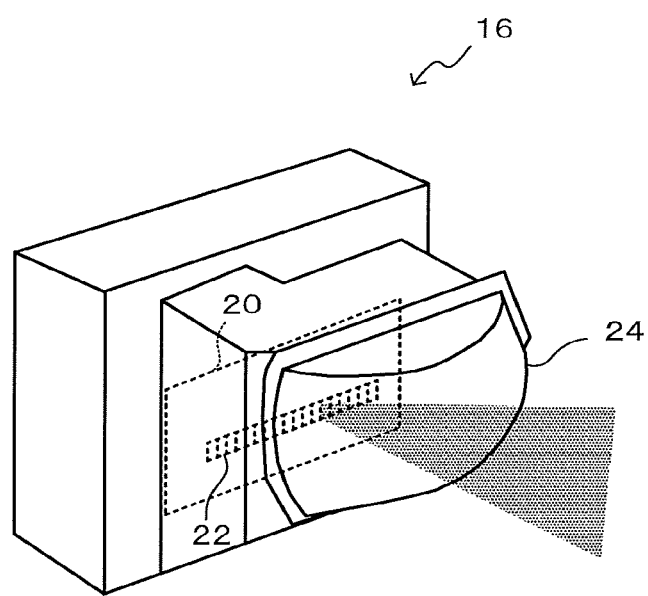
FIG. 3 is a diagram illustrating an example of a marking light illumination unit of an LED array type in which plural LEDs are arrayed.

FIG. 3 is a diagram illustrating an example of the marking light illumination unit 16 of an LED array type in which plural LEDs are arrayed.

In the LED array-type marking light illumination unit 16 shown in FIG. 3, a plural number of LEDs 22 are arrayed on a substrate 20. The plural LEDs 22 output lights with vertical length in the vehicle vertical direction, or plural numbers of the LEDs 22 are also arrayed in the vehicle vertical direction and output lights with vertical length. The plural LEDs 22 are arrayed in the vehicle width direction of the vehicle. A lens 24 is provided on light emission directions of the plural LEDs 22. Light is emitted to the front of the vehicle from the LEDs 22 through the lens 24. In this type of the marking light illumination unit 16, light with a linear shape may be illuminated in arbitrary directions by selectively lighting the plural LEDs 22. That is, by lighting the LED 22 that corresponds to a region separated from a detected person by the pre-specified distance, the control device 18 may illuminate the light with a linear shape on the road surface in the region separated from the person by the pre-specified distance.

Figure 4:
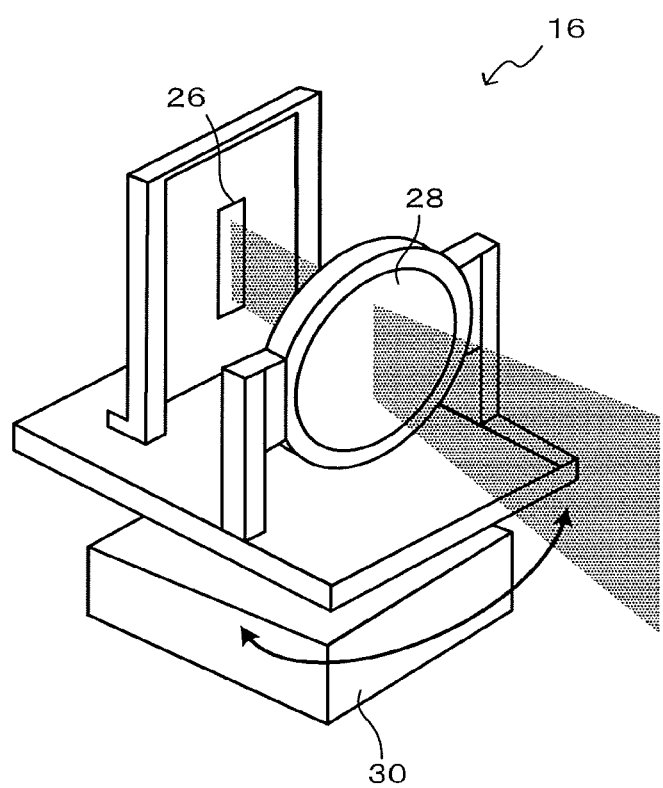
FIG. 4 is a diagram illustrating an example of a marking light illumination unit of a type in which a light source is turned.

FIG. 4 is a diagram illustrating an example of the marking light illumination unit 16 of a type in which a light source is turned.

The type of the marking light illumination unit 16 in FIG. 4 in which a light source is turned is provided with a light source 26 of a type such as an LED or the like, a lens 28 provided at the light emission side of the light source 26, and a swivel actuator 30 that turns the light source 26 and the lens 28 in the vehicle width direction. The light source 26 outputs a light with vertical length in the vehicle vertical direction, or light sources 26 such as LEDs or the like are arrayed in the vehicle vertical direction and output a light with vertical length in the vehicle vertical direction. The lens 28 is provided on the light emission direction of the light source 26. Light is emitted to the front of the vehicle from the light source 26 through the lens 28. In order to output light with vertical length in the vehicle vertical direction, the light emitted from the light source 26 may be converted by the lens 28 to a light with vertical length in the vehicle vertical direction and outputted. In this type of the marking light illumination unit 16, the light source 26 is lit and illuminates light with a linear shape, and the illumination direction of the light with a linear shape in the vehicle vertical direction is moved in the vehicle width direction by driving of the swivel actuator 30. That is, by controlling the swivel actuator 30 so as to illuminate the light with a linear shape at a position corresponding to a region separated from a detected person by the pre-specified distance, the control device 18 may illuminate the light with a linear shape at the region separated from the person by the pre-specified distance.

Figure 5:
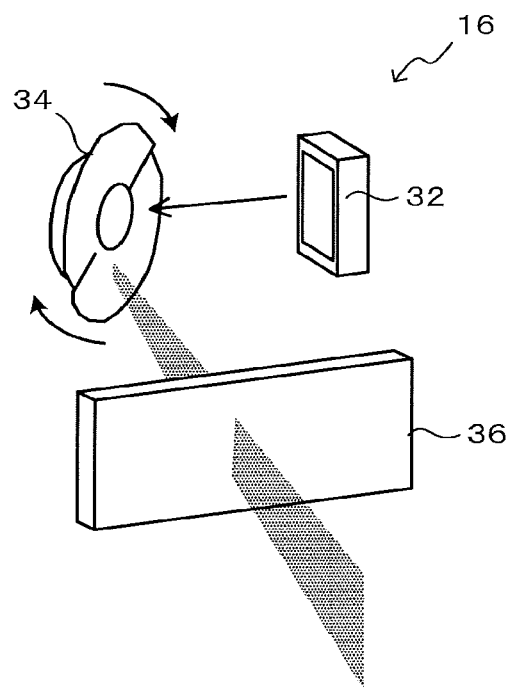
FIG. 5 is a diagram illustrating an example of a marking light illumination unit of a blade beam-scanning type in which a reflecting mirror is turned.

FIG. 5 is a diagram illustrating an example of the marking light illumination unit 16 of a blade beam-scanning type in which a reflecting mirror is turned.

The marking light illumination unit 16 of the blade beam-scanning type in FIG. 5 is provided with a light source 32 such as an LED or the like, a reflecting mirror 34 and a lens 36. The light source 32 outputs a light with vertical length in the vehicle vertical direction, or light sources 32 such as LEDs or the like are arrayed in the vehicle vertical direction and output a light with vertical length in the vehicle vertical direction. The reflecting mirror 34 and the lens 36 are provided on the light emission direction of the light source 32. The light emitted from the light source 32 is reflected by the reflecting mirror 34 and light in a linear shape is emitted to the front of the vehicle through the lens 36. The reflected direction can be altered in the vehicle width direction by turning of the reflecting mirror 34. In this type of the marking light illumination unit 16, light in a fan shape may be illuminated to the front of the vehicle by, for example, employing the technology recited in JP-A No. 2016-074235 and turning the reflecting mirror 34 at high speed while the light source 32 is lit. Hence, a light with a linear shape may be illuminated at a region separated from a person by the pre-specified distance by, rather than lighting the light source 32 continuously, lighting the light source 32 synchronously with positions of the turning reflecting mirror 34 that reflect the light in the direction of the region separated from the person by the pre-specified distance. That is, by controlling lighting of the light source 32 such that the light source 32 lights synchronously with the positions of the reflecting mirror 34 corresponding to the region separated from the detected person by the pre-specified distance, the control device 18 may illuminate a light with a linear shape on the road surface in the region separated from the person by the pre-specified distance. Alternatively, the reflecting mirror 34 may be turned so as to reflect and illuminate the light in the linear shape at the region separated from the detected person by the pre-specified distance, and the light source 32 may be lit in a state in which the reflecting mirror 34 is stopped.

Figure 6:
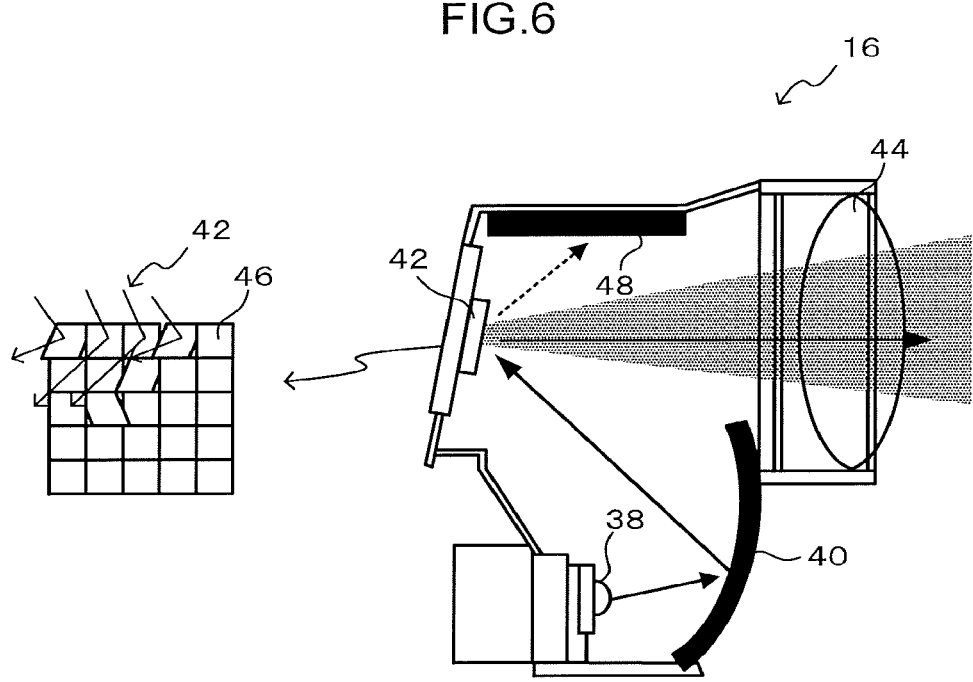
FIG. 6 is a diagram illustrating an example of a marking light illumination unit of a type that employs a digital micro mirror device.

FIG. 6 is a diagram illustrating an example of the marking light illumination unit 16 of a type that employs a digital micromirror device (DMD).

The marking light illumination unit 16 of the type that employs a DMD in FIG. 6 is provided with a light source 38 such as an LED or the like, a reflector 40, a DMD mirror 42 and a lens 44. Light emitted from the light source 38 is reflected by the reflector 40 and is incident on the DMD mirror 42. As shown in FIG. 6, the DMD mirror 42 is a device provided with numerous micromirrors 46, in which turning of each micromirror 46 is controllable. Thus, a region at which light is illuminated, a light distribution and the like may be controlled by lighting the light source 38 and controlling turning of the micromirrors 46 of the DMD mirror 42. For example, when angles of the micromirrors 46 are turned to the direction of a light-absorbing plate 48 provided inside a casing, light from the light source 38 is reflected in the direction of the dotted line in FIG. 6 and absorbed by the light-absorbing plate 48. Thus, light from the marking light illumination unit 16 is not illuminated but turned off. On the other hand, when the micromirrors 46 are turned to the direction of the lens 44, the light may be illuminated at arbitrary positions. Therefore, by controlling the angles of the micromirrors 46 of the DMD mirror 42 so as to illuminate light at positions corresponding to a region separated from a detected person by the pre-specified distance, the control device 18 may illuminate light in an arbitrary shape on the road surface in the region that is separated from the person by the pre-specified distance.

Figure 7:
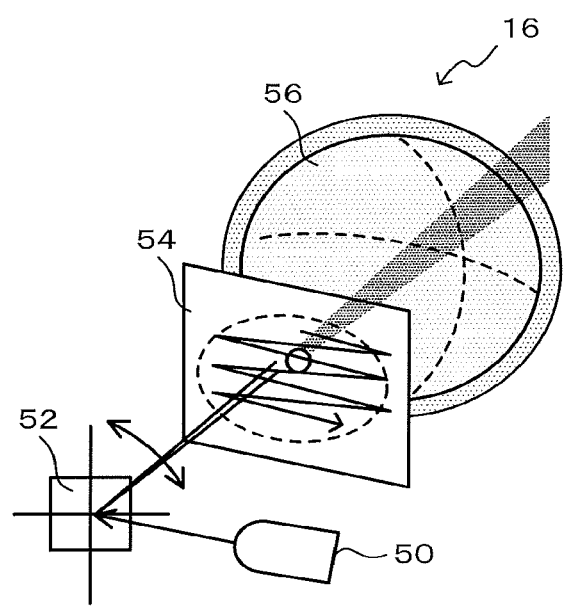
FIG. 7 is a diagram illustrating an example of a marking light illumination unit of a scanning microelectromechanical system type.

FIG. 7 is a diagram illustrating an example of the marking light illumination unit 16 of a scanning microelectromechanical system (MEMS) type.

The marking light illumination unit 16 of the scanning MEMS type in FIG. 7 is provided with a blue laser 50 that emits blue laser light, a MEMS mirror 52, a fluorescent body 54 and a lens 56. Light emitted from the blue laser 50 is reflected by the MEMS mirror 52 and is emitted through the fluorescent body 54 and the lens 56. The blue laser light is converted to white light by the fluorescent body 54 and emitted through the lens 56. The MEMS mirror 52 is a device in which, for example, mirrors are formed using a silver alloy on silicon, and the piezoelectric effect of PZT (lead zirconate titanate) thin films or the like is employed to move the mirrors. Laser light that is incident on the MEMS mirror 52 is reflected by resonant driving with the mirrors. Thus, the light may be illuminated in an arbitrary shape by raster scanning. That is, by controlling the MEMS mirror 52 so as to illuminate the light at a region separated from a detected person by the pre-specified distance, the control device 18 may illuminate light in a linear shape or light in an arbitrary shape on the road surface in the region separated from the person by the pre-specified distance.

The marking light illumination unit 16 of the blade beam-scanning type in FIG. 5, the marking light illumination unit 16 of the type that employs a DMD in FIG. 6, or the marking light illumination unit 16 of the scanning MEMS type in FIG. 7 may share a light source with a headlamp. However, for the blade beam-scanning type, sharing of the light source with a headlamp is enabled by providing a high-beam light source, a low-beam light source and a marking light source.

In the present exemplary embodiment, an example of illuminating light in a linear shape is described as an example of the marking light, but light in a linear shape is not a limitation. An image, characters or the like may be projected onto the road surface. This may be implemented by using, for example, the marking light illumination unit 16 of the blade beam-scanning type in FIG. 5, the marking light illumination unit 16 of the type that employs a DMD in FIG. 6, or the marking light illumination unit 16 of the scanning MEMS type in FIG. 7.

Figure 8:
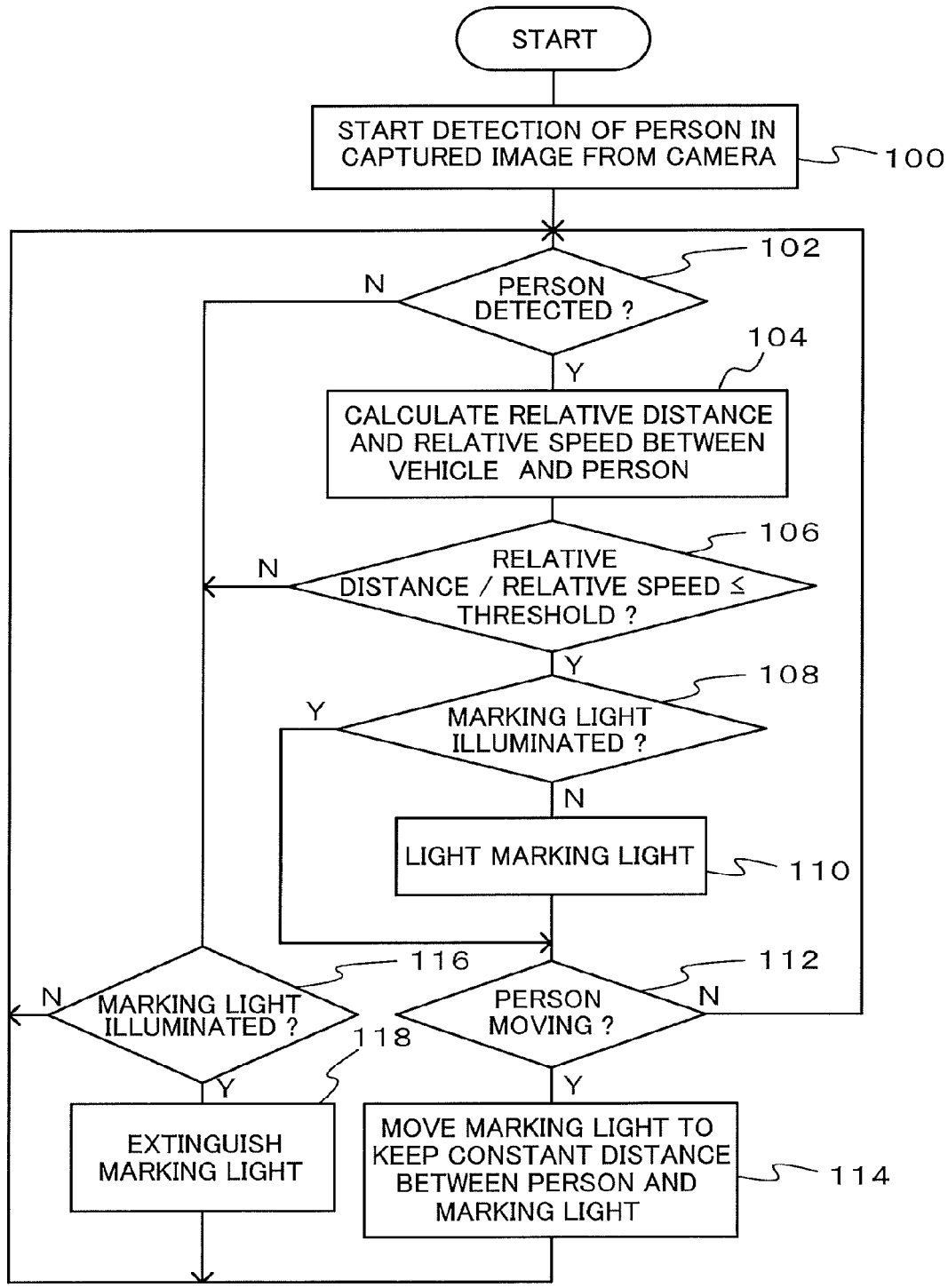
FIG. 8 is a flowchart showing an example of a flow of processing that is executed by a control device of the illumination device for a vehicle according to the present exemplary embodiment.

Now, processing that s executed by the control device 18 of the illumination device for a vehicle 10 according to the present exemplary embodiment structured as described above is described. FIG. 8 is a flowchart showing an example of a flow of processing that is executed by the control device 18 of the illumination device for a vehicle 10 according to the present exemplary embodiment. The processing in FIG. 8 is started when an ignition switch is turned on.

In step 100, the CPU 18A acquires a captured image from the camera 12 and starts detection of people in the captured image. That is, the CPU 18A starts detection of a person from the captured image using various image processing technologies such as pattern matching and the like.

In step 102, the CPU 18A makes a determination as to whether a person has been detected. If the result of this determination is affirmative, the CPU 18A proceeds to step 104, and if the result is negative, the CPU 18A proceeds to step 116.

In step 104, the CPU 18A calculates a relative distance and relative speed between the vehicle and the person, and then proceeds to step 106. In the present exemplary embodiment, the CPU 18A calculates the relative distance and relative speed between the detected person and the vehicle on the basis of detection signals from the millimeter wave radar 14.

In step 106, the CPU 18A divides the relative distance by the relative speed and makes a determination as to whether the calculated value is less than a pre-specified threshold value. This determination calculates a value representing a probability of collision by dividing the relative distance by the relative speed to make a determination as to whether the probability of a collision is high. If the result of this determination is affirmative, the CPU 18A proceeds to step 108, and if the result is negative, the CPU 18A proceeds to step 116. A method for determining a probability of collision is not limited thus and may be a determination using a value other than the value found by dividing the relative distance by the relative speed.

In step 108, the CPU 18A executes processing, which is described below, to make a determination as to whether the marking light is already being illuminated by the marking light illumination unit 16. If the result of this determination is negative, the CPU 18A proceeds to step 110, and if the result is affirmative, the CPU 18A proceeds to step 112.

In step 110, the CPU 18A lights the marking light by control of the marking light illumination unit 16, and then proceeds to step 112. Thus, light is illuminated at a region separated from the detected person by the pre-specified distance. The light is illuminated in the range of view of the person. Therefore, the illuminated light is easy to notice and may draw the person's attention effectively. When the marking light is lit, the marking light may be illuminated at a region separated to the front side of the person by the pre-specified distance, or may be illuminated at a region separated from the person toward a road center in the vehicle width direction by the pre-specified distance. When the marking light is illuminated at the front side of the person, the illuminated person is likely to notice the marking light. On the other hand, when the marking light is illuminated at the region separated from the person toward the center of the road in the vehicle width direction by the pre-specified distance, the person's attention may be drawn with regard to crossing the road. It may be that the marking light is illuminated to the front side of the person when the front of the person can be identified, but if a direction in which the person is likely to move and the front of the person are difficult to identify, the marking light is illuminated toward the center of the road in the vehicle width direction from the person, in order to warn against crossing the road.

In step 112, the CPU 18A makes a determination as to whether the detected person is moving. This determination may be made by, for example, determining movement in the vehicle width direction from captured images from the camera 12, and by determining movement in a direction along the running direction of the vehicle by calculating an absolute movement speed of the person from a speed of the vehicle and the relative speed between the vehicle and the person. If the result of this determination is affirmative, the CPU 18A proceeds to step 114, and if the result is negative, the CPU 18A returns to step 102 and repeats the processing described above.

In step 114, the CPU 18A controls the marking light illumination unit so as to move the marking light to keep the distance between the person and the marking light at a constant distance (the pre-specified distance). Then the CPU 18A returns to step 102 and repeats the processing described above. That is, the CPU 18A controls the marking light illumination unit 16 so as to follow movement of the person. Therefore, even when the person is moving, their attention may be drawn to the approach of the vehicle by the marking light.

Alternatively, in step 116, the CPU 18A executes the processing described above to make a determination as to whether the marking light is already being illuminated by the marking light illumination unit 16. If the result of this determination is affirmative, the CPU 18A proceeds to step 118, and if the result is negative, the CPU 18A returns to step 102 and repeats the processing described above.

Thus, in the present exemplary embodiment, when a person is detected and there is a possibility of collision with the vehicle, light is illuminated at a region separated from the person by the pre-specified distance that is within the range of view of the detected person. Therefore, the person is more likely to notice the light than if the light were illuminated toward the person. Moreover, because the light is easy to notice, attention may be drawn to the approach of the vehicle effectively.

Because the light follows movements of the person and is illuminated while maintaining the pre-specified distance, it is easy for a moving person to notice the light, and the attention of a person who is moving may be drawn effectively.

Figure 9:
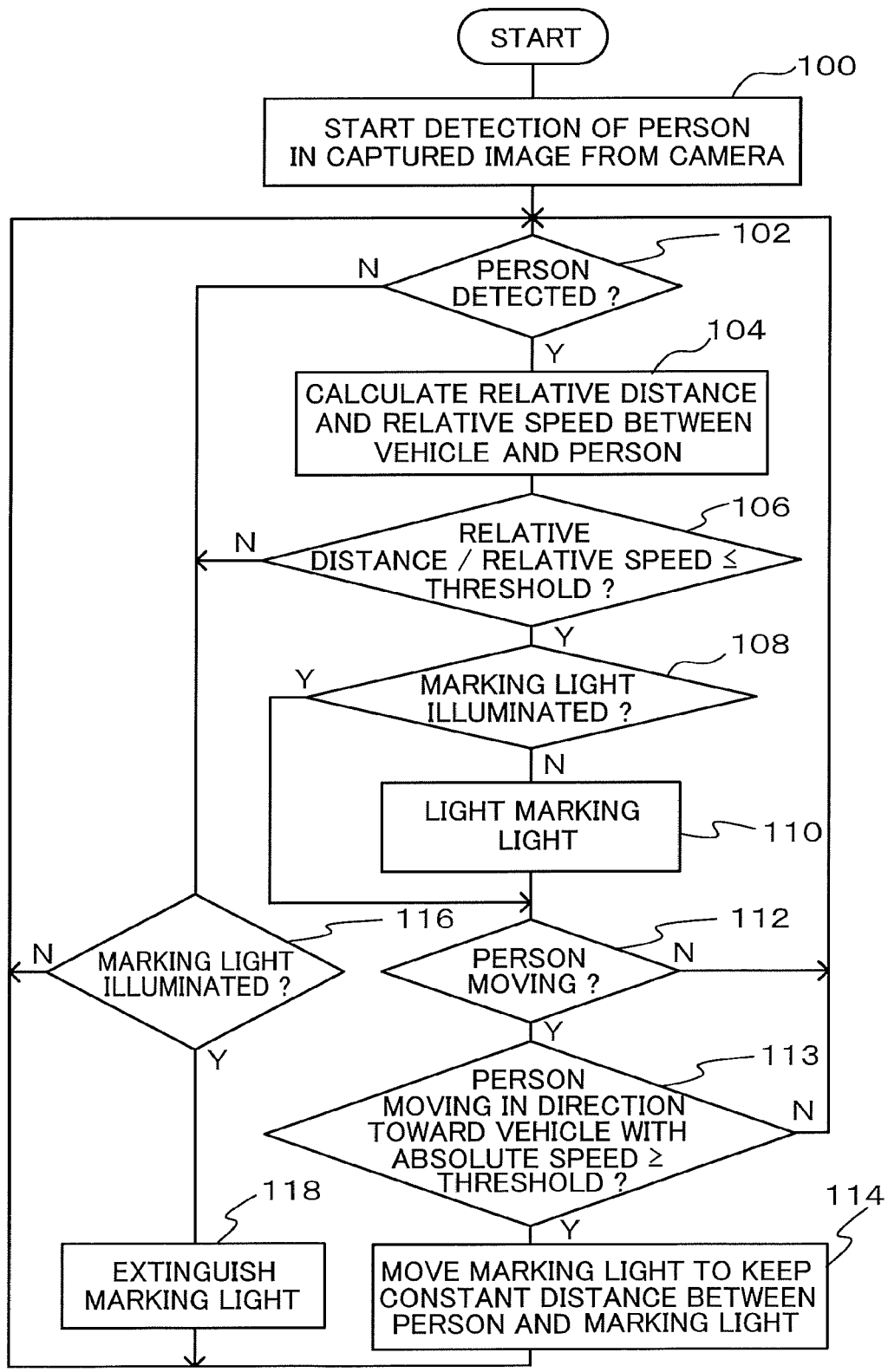
FIG. 9 is a flowchart showing a variant example of the flow of processing that is executed by the control device of the illumination device for a vehicle according to the present exemplary embodiment.

In the processing in FIG. 8, the marking light is lit when a person is detected, the marking light is moved in association with movements of the person, and the marking light is moved to follow the person even if the person is moving away from the vehicle. However, this is not limiting. For example, if a person is moving in a direction away from the vehicle in the vehicle width direction, the marking light need not be moved. As an example, as shown in FIG. 9, a step 113 may be added between step 112 and step 114. FIG. 9 is a flowchart showing a variant example of the flow of processing that is executed by the control device 18 of the illumination device for a vehicle 10 according to the present exemplary embodiment. In this example, in step 113, the CPU 18A makes a determination as to whether the person is moving in a direction toward the vehicle in the vehicle width direction and the absolute speed of the person is greater than a threshold value (which may be zero). If the result of this determination is affirmative, the CPU 18A proceeds to step 114 and moves the marking light. On the other hand, if the result of the determination is negative, the CPU 18A returns to step 102 and repeats the processing described above without moving the marking light. Thus, the marking light is not moved unnecessarily and a processing load may be moderated. Moreover, because a light that is not important for the illuminated person is not illuminated, difficulties caused by the illumination of light that is not important are avoided.

In the exemplary embodiment described above, an example is described in which a relative distance and relative speed between the vehicle and an obstacle such as a person or the like are detected by the camera 12 and the millimeter wave radar 14, but this is not limiting. For example, if a stereo camera is employed, a relative distance and relative speed between the vehicle and an obstacle may be detected without using a millimeter wave radar.

The processing illustrated in FIG. 8 and FIG. 9 that is executed by the control device 18 of the illumination device for a vehicle 10 in the above exemplary embodiment is described as being software processing that is implemented by a program being executed, but the processing may be implemented in hardware. Alternatively, the processing may combine both software and hardware. Further, the program memorized in the ROM may be memorized and distributed in any of various non-volatile storage media such as a CD-ROM, a DVD or the like.

A first aspect of the present disclosure includes: a detection unit that detects a person; an illumination unit that illuminates light in a direction toward a road surface, an illumination region of the light being alterable; and a control unit that, when a person is detected by the detection unit and there is a possibility of collision between the detected person and the vehicle, controls the illumination unit so as to illuminate light at a region in a range of view of the detected person that is separated from the person by a pre-specified distance, and so as to move the light n a direction of movement of the detected person while maintaining the separation at the pre-specified distance.

According to the first aspect, a person is detected by the detection unit. For example, a camera and a millimeter wave radar or the like are used to detect a person.

The illumination unit illuminates the light in the direction toward the road surface; an illumination region of the light is alterable. The person's attention may be drawn to the approach of the vehicle or the like by the light illuminated from the illumination unit.

When a person is detected by the detection unit and there is a possibility of collision between the detected person and the vehicle, the control unit controls the illumination unit so as to illuminate the light at a region separated by the pre-specified distance from the detected person within a range of view of the person, and so as to move the light in the movement direction of the detected person while maintaining the pre-specified distance.

As a result, because the light is illuminated at the region that is separated by the pre-specified distance from the person when the person is detected and there is a possibility of collision, attention may be drawn more strongly by the light. When this light is being illuminated, because the light is illuminated at the region separated by the pre-specified distance from the person in the range of view of the person, the illuminated person is more likely to notice the light than if the light were illuminated toward the person.

Moreover, because the light is controlled so as to move in the movement direction of the person while maintaining the pre-specified distance, the person is more likely to be aware of the light even though the person is moving, and their attention may be drawn effectively.

In a second aspect, when the person detected by the detection unit is moving in a direction away from the vehicle in a vehicle width direction, the control unit may control the illumination unit so as not to move the light. Thus, the light is not moved unnecessarily and a processing load may be moderated. Moreover, because the light is not illuminated without purpose for the illuminated person, difficulties caused by the illumination of unnecessary light are avoided.

In a third aspect, the control unit may calculate each of a relative distance and a relative speed between the vehicle and the detected person on the basis of detection results from the detection unit, and the control unit may determine that there is a possibility of collision between the detected person and the vehicle when a value that is the relative distance divided by the relative speed is less than or equal to a pre-specified threshold value. Thus, whether or not there is a possibility of collision with the vehicle may be determined easily.

In a fourth aspect, when the light is to be illuminated at the region that is separated from the detected person by the pre-specified distance, the control unit may control the illumination unit so as to illuminate the light at a region that is separated by the pre-specified distance from the detected person toward a road center in the vehicle width direction. Thus, the person's attention may be drawn with regard to crossing the road.

In a fifth aspect, the pre-specified distance may be a distance at which the person is likely to see the light illuminated on the road surface, being at least a distance corresponding to an angle of view downward of the person. That is, because the light is illuminated within their field of view, the illuminated person is more likely to be aware of the light.

According to the present disclosure as described above, an illumination device for a vehicle can be provided that may illuminate light that a person is more likely to notice than light illuminated toward the person.

The present disclosure is not limited by the above recitations. In addition to the above recitations, it will be clear that numerous modifications may be embodied within a technical scope not departing from the gist of the disclosure.

What is claimed is:

1. An illumination device for a vehicle, comprising:
   a detection unit that detects a person;
   an illumination unit that illuminates light in a direction toward a road surface, an illumination region of the light being alterable; and
   a control unit that, in a case in which a person is detected by the detection unit and there is a possibility of collision between the detected person and the vehicle, controls the illumination unit so as to illuminate light at a region in a range of view of the detected person that is separated from the person by a pre-specified distance, and so as to move the light in a direction of movement of the detected person while maintaining the separation at the pre-specified distance,
   wherein the control unit calculates each of a relative distance and a relative speed between the vehicle and the detected person on the basis of detection results from the detection unit, and
   wherein the control unit determines that there is a possibility of collision between the detected person and the vehicle in a case in which a value that is the relative distance divided by the relative speed is less than or equal to a pre-specified threshold value.

2. The illumination device for a vehicle according to claim 1, wherein, in a case in which the person detected by the detection unit is moving in a direction away from the vehicle in a vehicle width direction, the control unit controls the illumination unit so as not to move the light.

3. The illumination device for a vehicle according to claim 1, wherein, in a case in which the light is to be illuminated at the region that is separated from the detected person by the pre-specified distance, the control unit controls the illumination unit so as to illuminate the light at a region that is separated by the pre-specified distance from the detected person toward a road center in the vehicle width direction.

4. The illumination device for a vehicle according to claim 1, wherein the pre-specified distance is a distance at which the person is likely to see the light illuminated on the road surface, being at least a distance corresponding to an angle of view downward of the person.

5. A non-transitory recording medium storing a program causing a computer to execute a process for illuminating light from a vehicle, the process comprising:
   detecting a person; and
   in a case in which there is a possibility of collision between the detected person and the vehicle, controlling an illumination unit so as to illuminate light at a region in a range of view of the detected person that is separated from the person by a pre-specified distance, and so as to move the light in a direction of movement of the detected person while maintaining the separation at the pre-specified distance;
   calculating each of a relative distance and a relative speed between the vehicle and the detected person on the basis of detection results of the person; and
   determining that there is a possibility of collision between the detected person and the vehicle in a case in which a value that is the relative distance divided by the relative speed is less than or equal to a pre-specified threshold value.

6. The non-transitory recording medium according to claim 5, wherein the process further comprises, in a case in which the detected person is moving in a direction away from the vehicle in a vehicle width direction, controlling the illumination unit so as not to move the light.

7. The non-transitory recording medium according to claim 5, wherein the process further comprises, in a case in which the light is to be illuminated at the region that is separated from the detected person by the pre-specified distance, controlling the illumination unit so as to illuminate the light at a region that is separated by the pre-specified distance from the detected person toward a road center in the vehicle width direction.

8. The non-transitory recording medium according to claim 5, wherein the pre-specified distance is a distance at which the person is likely to see the light illuminated on the road surface, being at least a distance corresponding to an angle of view downward of the person.

* * * * *